United States Patent [19]
Dornbusch et al.

[11] Patent Number: 5,294,970
[45] Date of Patent: Mar. 15, 1994

[54] SPATIAL POSITIONING SYSTEM

[75] Inventors: Andrew W. Dornbusch; Eric J. Lundberg; Yvan J. Beliveau; Timothy Pratt, all of Blacksburg, Va.

[73] Assignee: Spatial Positioning Systems, Inc., Blacksburg, Va.

[21] Appl. No.: 755,780

[22] Filed: Sep. 6, 1991

Related U.S. Application Data

[63] Continuation-in-part of Ser. No. 636,459, Dec. 31, 1990, Pat. No. 5,110,202.

[51] Int. Cl.$^5$ .......................... G01B 11/26; G01C 3/00
[52] U.S. Cl. ........................................... 356/152; 356/1
[58] Field of Search ........................ 356/1, 4, 141, 152; 172/4.5

[56] References Cited

U.S. PATENT DOCUMENTS

| | | | |
|---|---|---|---|
| 4,700,301 | 10/1987 | Dyke | 356/1 |
| 4,709,580 | 12/1987 | Butts, Jr. et al. | 244/158 R |
| 4,791,297 | 12/1988 | Savoca et al. | 356/152 |
| 4,820,041 | 4/1989 | Davidson et al. | 356/1 |
| 4,830,489 | 5/1989 | Cain et al. | 356/4 |
| 4,895,440 | 1/1990 | Cain et al. | 356/4 |

*Primary Examiner*—Stephen C. Buczinski
*Attorney, Agent, or Firm*—Parkhurst, Wendel & Rossi

[57] ABSTRACT

A spatial positioning system includes fixed referent stations which emit rotating, divergent laser beams and a portable reflector. Each fixed station also includes a detector and a processor. The portable reflector may include retroreflectors or transponders. When the rotation of the laser beam is such that it is in line with a portable reflector, the transmitted laser beam is reflected off the portable reflector and received at the fixed receiver. For any point which is crossed by the fanned laser beams of a fixed station, a horizontal angle can be determined. Once these horizontal angles are known for three fixed stations, the point of intersection of three planes, and thus the three-dimensional position of the point, is determined.

16 Claims, 4 Drawing Sheets

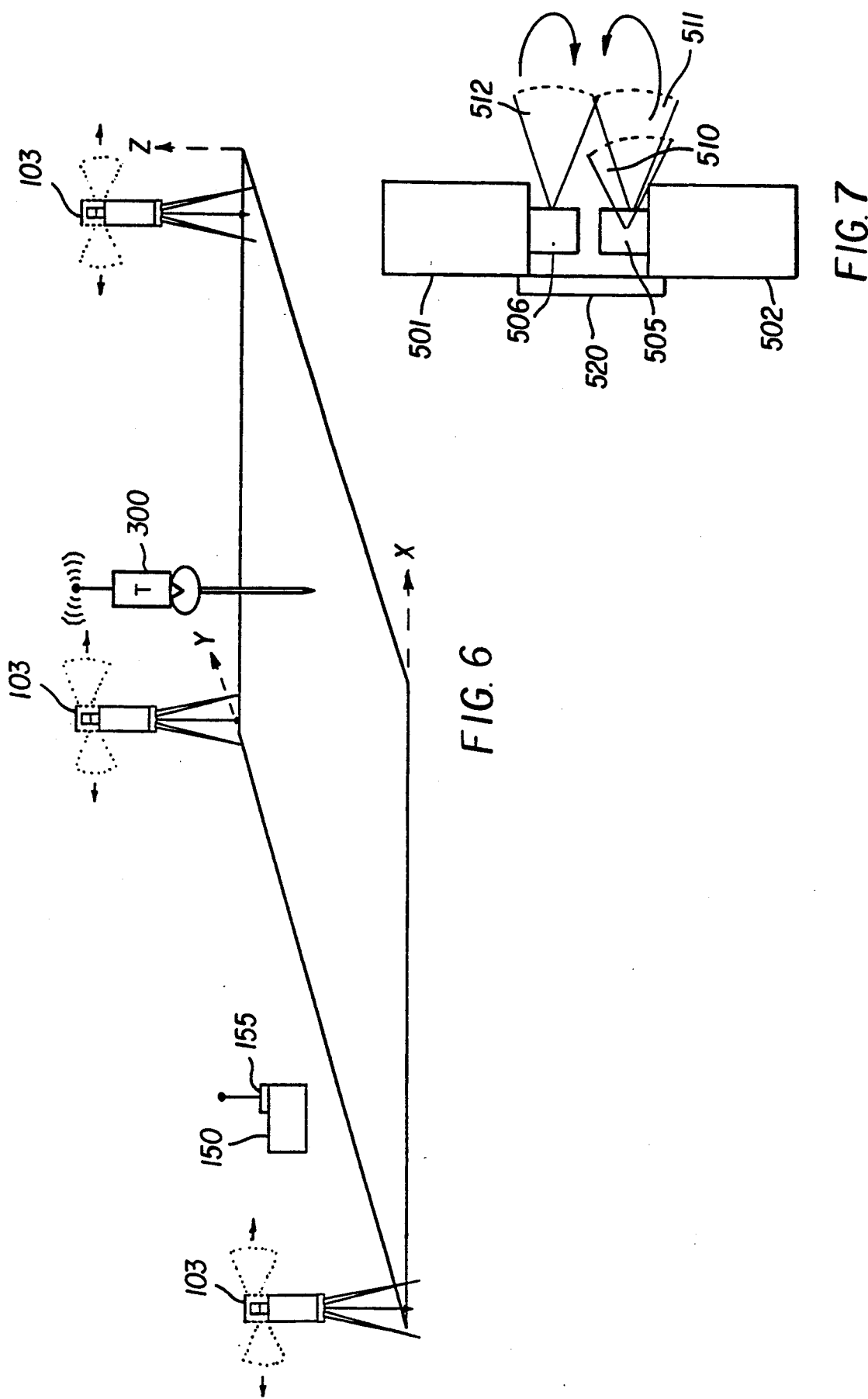

5,294,970

SPATIAL POSITIONING SYSTEM

This application is a continuation-in-part of application Ser. No. 07/636,459, filed Dec. 31, 1990, now U.S. Pat. No. 5,110,202, which is incorporated herein by reference.

FIELD OF THE INVENTION

The present invention relates to a spatial positioning and measurement system and, more particularly, to a spatial positioning and measurement system which provides three-dimensional position and/or measurement information of an object using one or more fixed referent station systems, and one or more portable position sensor systems.

BACKGROUND OF INVENTION

In the Dornbusch et al. invention (U.S. patent application 07/636,459 incorporated herein), fixed stations are used in locating one or more portable positioning sensors. Each fixed station produces a set or multiple sets of counter-rotating laser beams which rotate at constant angular velocity. The portable position sensor, which includes a light sensitive detector and computer, can determine its location in reference to the fixed stations, through time measurement of the received laser beams.

It is envisioned that in certain applications it would be useful to maintain processing and display capabilities in a central location. The Dornbusch et al. invention does not provide for this. In addition the Dornbusch et al. invention uses a global frame of reference and requires a number of known site positions in order for the portable position sensor to determine the positions of the fixed referent stations through a calibration sequence.

SUMMARY OF INVENTION

The present invention overcomes the above difficulties by providing a system whereby the fixed referent stations may determine their location in reference to one another, establishing a local coordinate system. This information may be transferred to a portable position sensor for use in determining its location.

The present invention provides a spatial positioning and measurement system utilizing at least three fixed stations to determine the position of one or more portable positioning reflectors. Each fixed station produces a set of rotating fan-shaped laser beams which rotate at constant angular velocity. Each fixed station also includes a receiving device, which is light sensitive. When the rotation of the laser beam is such that it is in line with a portable positioning reflector, the transmitted laser beam is reflected off the portable position reflector and received at the fixed receiver.

For any point which is crossed by the fanned laser beams of a fixed station, an angle perpendicular to the rotation of the laser beam angle can be determined. Once these angles are known for three fixed stations, the point of intersection of three planes, and thus the three-dimensional position of the point, is determined.

The portable positioning reflector (hereinafter called the "P-reflector") includes a reflective surface or surfaces, which redirect the incoming laser light back toward the fixed station. A retroreflector, which is used with an electronic distance measurement devices (EMD's), is an example of a reflector which could be used as the reflective surface(s) of the P-reflector. A number of retroreflectors preferably would be used to provide a 360 degree horizontal reflecting capability.

The fixed position sensor preferably includes a light sensitive detector (hereinafter called the "detector") and a computer. The detector preferably includes a lens system which directs light to a photosensitive detector. The detector generates an electrical pulse when struck by a laser beam. This pulse is sent to a computer. The computer time labels each received pulse, which corresponds to the time the reflected laser beam from the P-reflector strikes the optical receiver. Once the computer has accepted, time-labeled and recorded a reflected primary pulse and reflected secondary pulse from the P-reflector, it can determine the directional angles of the P-reflector relative to the fixed station.

The directional angles are sent to a central processor system, via a communications link. The central processor system receives angle information from a number of fixed stations. If the central processor system receives angle information from at least three fixed stations, the position of the retroreflector can be determined.

Alternatively, a portable positioning transponder (hereinafter called the "P-transponder") may be substituted for the P-reflector. The P-transponder would include a light sensitive detector. The light sensitive detector may be sensitive to light 360 degrees about the horizontal plane. An energy beam (e.g. light, radio) is emitted by the P-transponder when light from a fixed station is received by an optical detector on the transponder. The emitted wave is received back at the fixed station by a transponder receiver. In this embodiment, the transponder receiver on the fixed station would need to be of an appropriate type to receive the emission from the transponder.

Alternatively, if the energy beam emitted by the P-transponder is uniquely different in type from the laser beam energy transmitted by the fixed stations, a single transponder receiver may be located in the area to receive all signals from the P-transponder.

The use of a P-transponder increases the range of the positioning system by eliminating the reflected path of the laser beam.

If the distance between any two points within the coordinate system is known, then a local coordinate system can be established through resection equations (an EDM, a cable or any other device which can determine the distance between two point can be used to accomplish this). The situation is analogous to knowing the three angles of a triangle in two dimensional space; the triangle can be any size and still have the same three vertex angles. According to the invention, the position and attitude of any two fixed stations can be arbitrarily set and the position of a third calculated. However, the scale of the calculated positions would have no correlation with the scale of the actual system. If any two points are known in the calculated system and the corresponding distance known, a scale factor can be included which would allow the determination of the actual positions of the fixed stations in reference to one another.

In this case the rotation of the laser beams of the fixed stations are assumed to be known, e.g. vertical or horizontal.

Alternatively, fixed stations can be used which produce multiple sets of rotating beams. In this case, a minimum of two fixed stations are required to provide the position of a portable positioning sensor, reflector, or transponder.

BRIEF DESCRIPTION OF THE DRAWINGS

The above aspects of the present invention can be seen from the attached drawings, in which:

FIG. 6 is a schematic drawing of the positioning system configured for use with a portable positioning transponder and a central receiving and processing system in accordance with another embodiment;

FIG. 7 is a schematic drawing of the fixed station in accordance with the embodiment shown in FIG. 6.

DETAILED DESCRIPTION OF THE PREFERRED EMBODIMENTS

Figure 4:
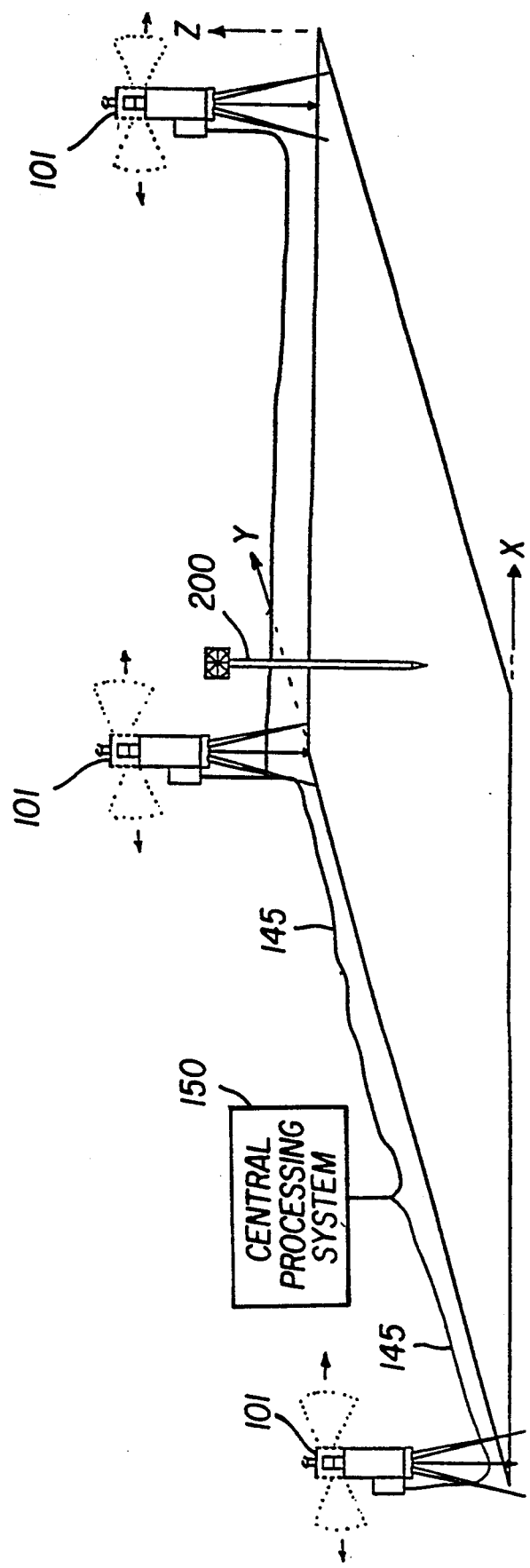
FIG. 4 is a schematic drawing of the positioning system configured for use with a portable positioning reflector in accordance with a preferred embodiment of the invention.

A spatial positioning and measurement system in accordance with a preferred embodiment of the invention is shown in FIG. 4.

Figure 1A:
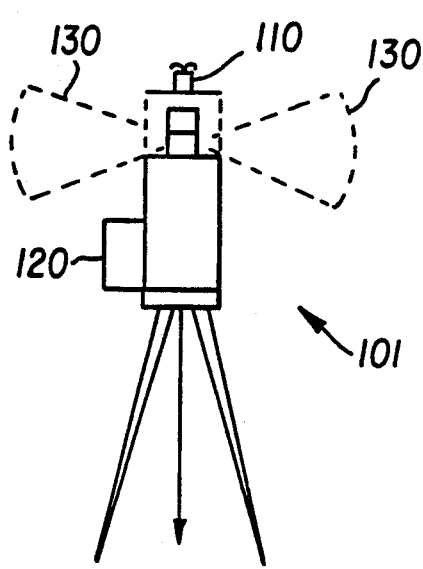
FIG. 1a is a schematic drawing of the fixed station in accordance with a preferred embodiment of the invention.
Figure 2:
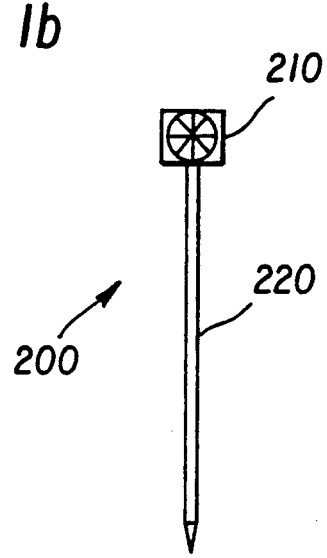
FIG. 2 is a schematic drawing of the portable positioning reflector in accordance with a preferred embodiment of the invention.

The reflector positioning system:

The reflector positioning system includes a portable positioning reflector 200, shown in FIG. 2 and three or more fixed stations 101, shown in FIG. 1a.

The portable positioning reflector (hereinafter referred to as "P-reflector") 200 includes a 360° retroreflector unit 210 and a rod 220. The retroreflector unit preferably includes a plurality of retroreflectors arranged around the upper end thereof. The retroreflector unit 210 reflects light parallel to its incoming direction and produces a virtual image which is at it center. Alternatively, the rod 220 can be replaced by a tool or machine which is specifically suited for the positioning or measurement work being performed.

The fixed stations 101 are located at known points in and/or around a measurement area, as shown in FIG. 4. The fixed station 101 generates a sets of rotating fanned laser beams 130. These fanned laser beams 130 periodically strike the P-reflector 200. The retroreflector unit 210 reflects the fanned laser beams 130 back toward the fixed station 101. The reflected light beam is received by a light sensitive detector 110 located on the fixed station 101. The light sensitive detector 110 generates an electrical pulse each time it receives a reflected light beam. The electrical pulses are sent to a processor 120 where they are individually time-labeled. The horizontal angle of the fanned laser beams as they strike the P-reflector 200 are determined at the processor by mathematical algorithms which use the timing information provided by the time-labels. For a general discussion of time-labelling in a spatial positioning system, see U.S. application Ser. No. 07/570,268, the contents of which are incorporated herein by reference.

The angle information is sent, via a communications link 145, to a central processing system 150. The central processing system 150 can determine the position of the P-reflector 200 if angle information is received from three or more fixed stations 101. The position of the P-reflector 200 is the intersection of the fanned laser beams from the three fixed stations as determined through plane equations:

$$\cos \phi_{0,0} \sin (\theta_{0,0} - \theta'_0)(x - x_0) - \cos \phi_{0,0} \cos (\theta_{0,0} - \theta_0)(y - y_0) - \sin \phi_{0,0}(z - z_0) = 0$$

$$\cos \phi_{0,1} \sin (\theta_{0,1} - \theta'_0)(x - x_0) - \cos \phi_{0,1} \cos (\theta_{0,1} - \theta_0)(y - y_0) - \sin \phi_{0,1}(z - z_0) = 0$$

$$\cos \phi_{n,1} \sin (\theta_{n,1} - \theta'_0)(x - x_0) - \cos \phi_{n,0} \cos (\theta_{n,0} - \theta_0)(y - y_0) - \sin \phi_{n,0}(z - z_0) = 0$$

given: $(x,y,z)$, $\theta, \phi$ for $i \epsilon [0,n]$, $j \epsilon [0,m]$ where n = number of fixed stations and m = number of laser beams for fixed station i.

The equations are solvable using standard matrix solving techniques.

The communication link may be of any suitable type including, but not limited to, radio, optical fiber, microwave, and cable.

Alternatively, the time-labels, generated by the processor 120 at the fixed station 101, can be sent directly to the central processing system 150. The central processing system 150 would then perform all angle and position calculations necessary for determining the position of the P-reflector 200. Using this method the time references at the fixed stations would need to be synchronized.

Alternatively, the electrical pulses, generated by the light sensitive detector 110 of the fixed station 101, can be sent directly to the central processing system 150. The central processing system 150 would then perform the time-labeling of the electrical pulses and perform all angle and position calculations necessary for determining the position of the P-reflector 200.

Figure 1B:
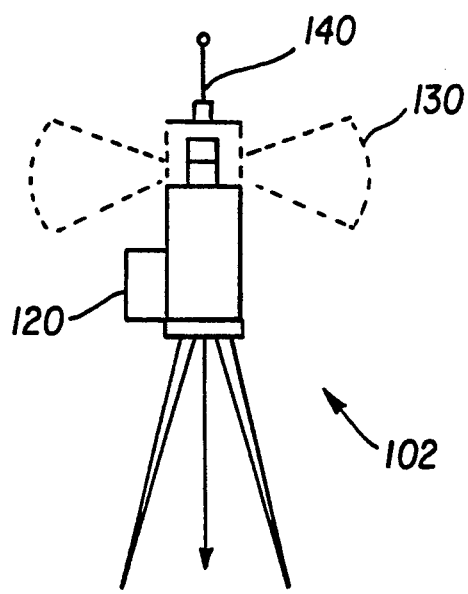
FIG. 1b is a schematic drawing of the fixed station for use with a transponder in accordance with a preferred embodiment of the invention.
Figure 3:
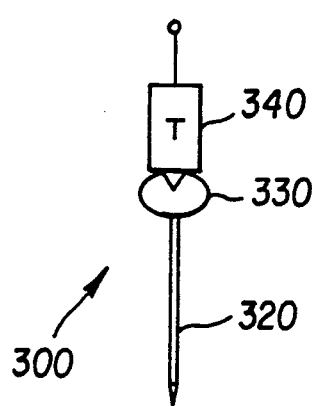
FIG. 3 is a schematic drawing of the positioning transponder for use in the embodiment shown in FIG. 1b.
Figure 5:
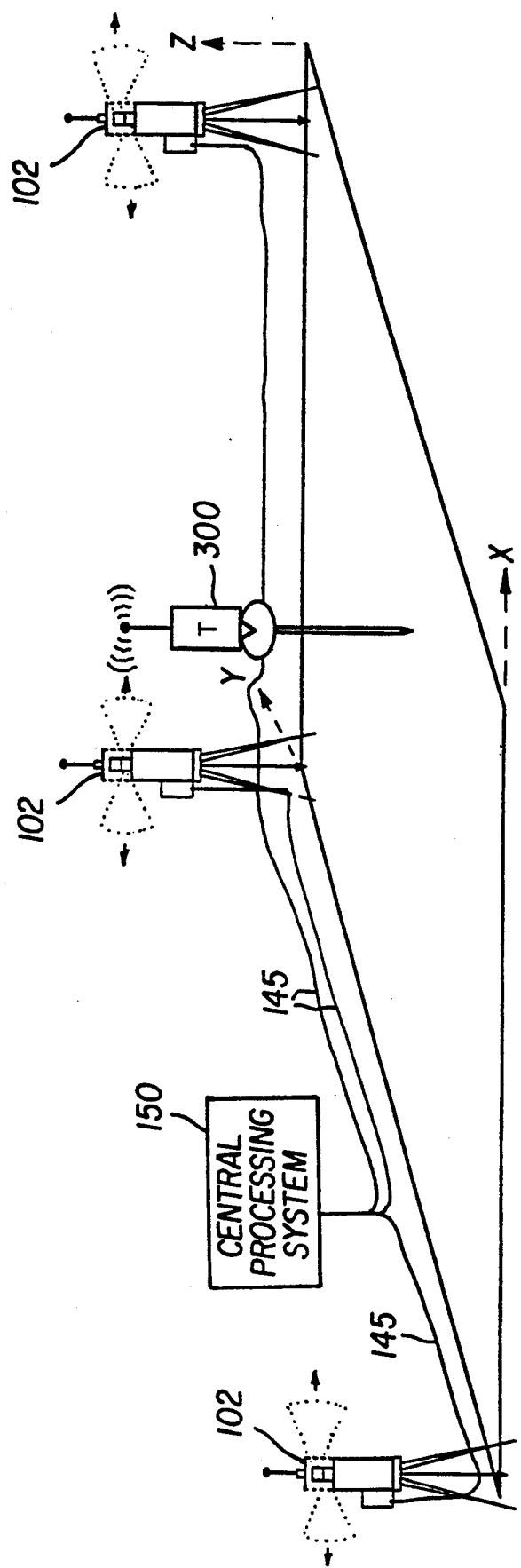
FIG. 5 is a schematic drawing of the positioning system configured for use with a positioning transponder in accordance with the embodiment shown in FIG. 1b.

The Transponder System:

Alternatively, a portable positioning transponder (hereinafter referred to as "P-transponder") 300, shown in FIGS. 3 and 5, may be used in place of the P-reflector 200. The P-transponder 300 includes an optical light detector 330, a transponder 340, and a rod 320. The optical light detector 330 preferably has a view of 360° on the horizontal plane and a view less than +/−90° vertically. The optical light detector 330 senses changes in the magnitude of light energy (e.g. the presence of a fanned laser beam 130). A fixed station 102, as shown in FIG. 1b, is used in conjunction with P-transponder 300. The fixed station 102 is fitted with a transponder receiver 140 which is suited for receiving emissions from the P-transponder 300. The receiver 140 replaces the light sensitive detector 110 used in the P-reflector embodiment discussed above.

When a fanned laser beam 130 from a fixed station 102 is detected by the optical light detector S30, an electrical pulse is generated and sent to the transponder 340. The receipt of the electrical pulse triggers the transponder 340 and causes an energy beam to be emitted. The energy beam may be of any suitable type, including electromagnetic energy in the visible or radio frequencies.

The energy beam created by the transponder 340 is received by a transponder receiver 140. The receiver 140 creates an electrical pulse each time it receives an energy beam from the transponder 340. The electrical pulses are sent to the processor 120 where they are individually time-labeled. The horizontal angle of the fanned laser beams 130 as they strike the P-transponder 300 are determined at the processor 120 by mathematical algorithms which use the timing information provided by the time-labels. The time delay caused by electronics must be accounted for in calculations, if these delays are not constant.

The horizontal angle information is sent, via a communications link 145, to a central processing system 150. The central processing system 150 can determine the position of the P-transponder 300 if angle information is received from three or more fixed stations 102. The position of the P-transponder is the intersection of the fanned laser beams from the three fixed stations 102 of this determined through plane equations as in the previous embodiment.

The communication link 145 may be of any suitable type, including, but not limited to, radio, optical fiber, microwave, and cable.

Alternatively, the time-labels, generated by the processor 120 at the fixed station 102, can be sent directly to the central processing system 150. The central processing system 150 would then perform all angle and position calculations necessary for determining the position of the P-transponder 300. Using this method the time references at the fixed stations would need to be synchronized.

Alternatively, the electrical pulses, generated by the light sensitive detector 110 of the fixed station 102, can be sent directly to the central processing system 150. The central processing system 150 would perform the time-labeling of the electrical pulses and perform all angle and position calculations necessary for determining the position of the P-transponder 300.

Figure 1C:
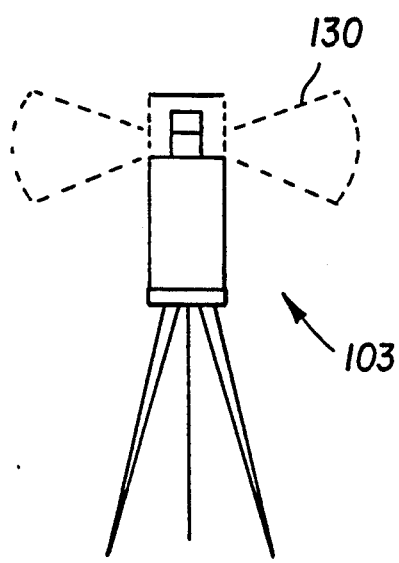
FIG. 1c is a schematic drawing of the fixed station for use with a central receiving and processing system in accordance with a preferred embodiment of the invention.

Alternatively, the energy beam emitted by the P-transponder 300 can be received by a transponder receiver 155 at the central processing system 150, as shown in FIG. 6. The transponder receiver 155 creates an electrical pulse each time it receives an energy beam. The electrical pulse is sent to the central processing system 150. The central processing system 150 performs the time-labeling of the electrical pulses and performs all angle and position calculations necessary for determining the position of the P-transponder 300. Thus, in this embodiment of the present invention, no receiving or signal processing capability is required in order to determine position information. Fixed station 103 has no receiving or signal processing capability at the fixed station, as shown in FIG. 1c.

The central processing system 150 may include a monitor which continually outputs position information. In addition, the central processing system 150 may include a plotter or other printing device for outputting position information. The central processing system 150 may also include a control system for remote control of a vehicle or other device, attached to a portable position sensor, reflector, or transponder.

In addition, if the fixed stations 101 used in any of the above embodiments produce two or more sets of rotating fanned laser beams, only two fixed stations 101 are necessary to determine the location of any of the portable position sensors, reflectors, or transponders.

The use of fixed stations which have optical receiving and processing capabilities allows the position of the fixed stations to be determined in reference to each other.

Since the fixed stations can determine their position in reference to one another, fixed stations can be repositioned as long as two fixed stations remain stationary during repositioning of the other stations.

The Counter-rotating / Rotating System:

The invention also includes an alternative fixed station 500, as shown in FIGS. 6 and 7. According to this embodiment, the lower optics 505 of each fixed station 500 produce a pair of fanned laser beams 510, 511, beam 510 being slanted from the axis of rotation 510 and beam 511 being parallel to the axis of rotation. The upper optics 506 of each fixed station produce fanned laser beam 512 which is parallel to the axis of rotation.

Alternatively, any combination of fanned laser beams or sets of fanned laser beams and inclination of fanned laser beams can be used.

The rotation of beams 510 511 is controlled by motor 502 while the rotation of beam 512 is controlled by motor 501. The two motors, 501 and 502, are rotated at different speeds. The fanned laser beams from the two motors, 510, 511, 512, can be differentiated via software phase-locked-loops (PLL's). The two motors, 501 and 502, rotate in relation to one another in the following way:

$$jA = kB$$

where:
  A = angular velocity of motor 501
  B = angular velocity of motor 502
  j, k = integers, with $j \neq k$ For example: Let j=7 and k=8, motor 501 would spin 8 revolutions in the time motor 502 would spin 7.

Let j=2 and k=1, motor 501 would spin once in the time motor 502 would spin twice.

This equation defines a relationship between the two motors, 501 and 502. The direction in which each of the two motors, 501 and 502, spin is unimportant. Position of a portable position sensor can be determined whether the motors counter-rotate or rotate together in the same direction.

In order to establish a fixed reference, it is necessary to cause the laser to pulse periodically. A shutter 520 covers the angular field of view defined by the difference in total angular rotation during one rotation of the slower motor. Turning the laser off and then on again while the fanned laser beams 510, 511 and 512 are within the field of the shutter removes any ambiguity in identification of the beams. If the two motors, 501 and 502, are spinning at an integer multiple of one another, the size of the shutter 520 required is minimal. The shutter 520 needs only to be large enough to cover any hysteresis in the power supply to the laser. By monitoring the missing pulses, the processor can identify the laser beams 510, 511, and 512.

If the signal to the receiver is never lost or if the transmitter angle can be determined when signal is regained, then the laser never need be turned off. Software can track change in the angle to the receiver simply by monitoring the change of the strike pattern and the receiver.

The above is for illustrative purposes only. Modifications can be made within the scope of the invention as defined by the appended claims. For example, it is contemplated that each fixed station may produce a plurality of fan-shaped beams which oscillate back and forth instead of rotating. This oscillation may be achieved via any of a number of known mechanical, acousto-optical and other suitable mechanisms.

We claim:

1. A spatial positioning and measurement system for determining the instantaneous x-y-z position of an object in a three-dimensional Cartesian coordinate system, said system comprising:

a plurality of fixed referent stations located at known locations within a local coordinate system, each said referent station including emitter means for emitting at least two sweeping radiation beams which are divergent in a plane perpendicular to the plane in which they are swept;

a portable reflector means for reflecting said beams toward said fixed referent stations;

detecting means for detecting said beams, said detecting means generating a signal each time one of said beams is detected; and determination means for determining the x-y-z position of said portable reflector means and each of said other fixed referent stations relative to each other within said local coordinate system based upon said signals generated by said detecting means.

2. A system as in claim 1, wherein said beams rotate.

3. A system as in claim 1, wherein said beams oscillate.

4. A system as in claim 1, wherein three of said fixed referent stations are used, each said fixed station producing two rotating laser beams.

5. A system as in claim 1, wherein three of said referent stations are used, each said fixed station producing a pair of counter-rotating laser beams.

6. A system as in claim 1, wherein said detecting means are disposed at each of said fixed referent stations.

7. A system as in claim 6, wherein said determination means includes a processor which time-labels each of said signals generated by said detecting means, and a central processing system which receives said time-labelled signals generated by said processor and calculates all angle and position information therefrom.

8. A system as in claim 7, wherein said reflecting means is a retroreflector.

9. A system as in claim 1, wherein said reflecting means is a retroreflector.

10. A system as in claim 1, wherein said reflecting means is a transponder, and said detecting means is a transponder receiver.

11. A system as in claim 10, wherein said determination means includes a processor which time-labels each of said signals generated by said detecting means, and a central processing system which receives said time-labelled signals generated by said processor and calculates all angle and position information therefrom.

12. A system as in claim 11, wherein said transponder receiver is disposed at said central processing system.

13. A system as in claim 1, wherein each of said fixed referent stations generates a pair of rotating laser beams and a third rotating laser beam.

14. A system as in claim 13, wherein the laser beams in said pair of laser beams rotate in opposite directions.

15. A system as in claim 13, wherein said laser beams pulse periodically.

16. A system as in claim 15, wherein a shutter is used to cause said laser beams to pulse periodically.

* * * * *